UNITED STATES PATENT OFFICE.

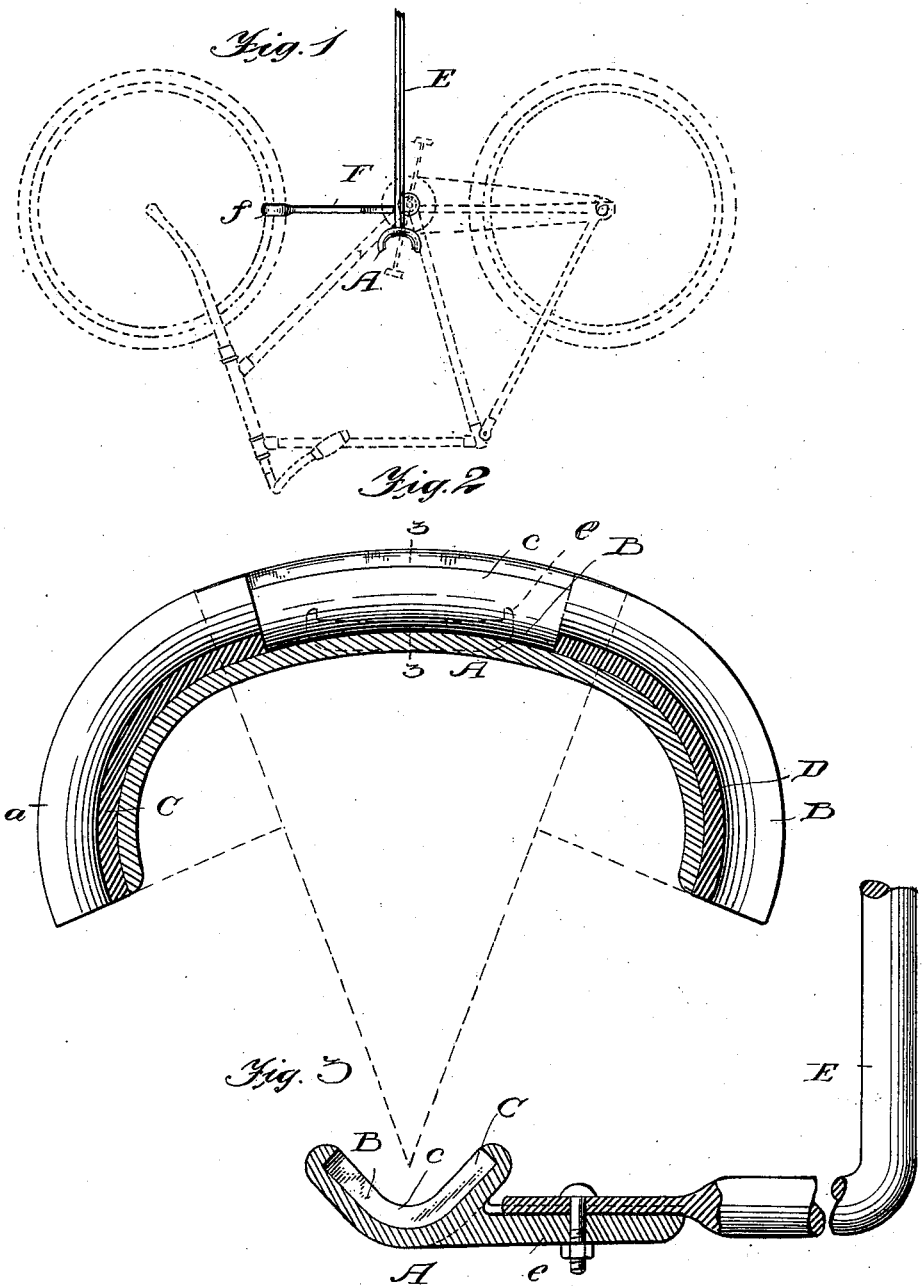

HOWARD T. SACKETT, OF FOND DU LAC, WISCONSIN.

BICYCLE-SUPPORT.

SPECIFICATION forming part of Letters Patent No. 602,270, dated April 12, 1898.

Application filed January 29, 1897. Serial No. 621,224. (No model.)

*To all whom it may concern:*

Be it known that I, HOWARD T. SACKETT, a citizen of the United States, residing at Fond du Lac, in the county of Fond du Lac and State of Wisconsin, have invented certain new and useful Improvements in Bicycle-Supports; and I do hereby declare the following to be a full, clear, and exact description of the invention, such as will enable others skilled in the art to which it appertains to make and use the same.

My invention relates to improvements in bicycle-supports for holding a bicycle out of the way in a store, car, or other place.

The object that I have in view is to provide a simple and cheap construction adapted to fit the frames of the different kinds of safety-bicycles.

It is well known to those skilled in the art that the saddle-post and front bar which branch out from the crank-hanger of a bicycle vary in their inclination to each other in the different styles of bicycles manufactured and placed on the market and that in some cases the saddle-post is of greater diameter than the inclined front bar of the bicycle-frame.

In my improved hanger or support I provide an overhanging arm and a bearing-block attached to said arm. This block is designed to fit between and against the saddle-post and front bar of a bicycle-frame when the bicycle is inverted or turned to an upright position in order to rest in the block and be sustained by the hanger or support. For the reason that the bicycle-frame rests upon the part heretofore called the "block" I will hereinafter designate it as the "saddle." The gist of my present invention resides in the construction of this saddle, and the peculiarity of the latter resides in the fact that it embodies in a single integral part or element two bearing-faces for the divergent bars of a bicycle-frame, whereby the saddle serves of itself as the means for receiving the bicycle to be upheld by the hanger or support. This construction is designed, primarily, as an improvement upon that class of bicyle-holders in which two spaced blocks or hooks are employed to engage, respectively, with different divergent bars of a bicycle-frame; but my improvement simplifies the construction, makes it cheaper, and provides a strong durable support in which the bicycle-frame is not liable to be displaced, so as to sustain a fall or injury.

The hanger-arm, which carries the saddle, may be attached to an overhead ceiling or to a side wall of a room, car, or other place, or said hanger-arm may be fastened in place to any object and in any preferred way, the gist of the present invention residing in the novel construction of the saddle or bearing-piece.

To enable others to understand my invention, I have illustrated the same in the accompanying drawings attached hereto and forming a part hereof, referring to which—

Figure 1 is a view in side elevation, showing the improved hanger adapted as an overhead support for a bicycle, the latter indicated by dotted lines. Fig. 2 is an enlarged longitudinal sectional view of the saddle or bearing-piece, illustrating its peculiar contour. Fig. 3 is a vertical transverse sectional view on the plane indicated by the dotted line 3 3 of Fig. 2.

Like letters of reference denote corresponding parts in all the figures of the drawings.

My improved bearing-block or saddle is represented at A, reference being had more particularly to Figs. 2 and 3. This saddle in general is curved throughout its length to somewhat of a crescent shape in order to present bearing-faces $a\ b$, which face in opposite directions, although the particular crescent shape is not essential. I prefer to make the saddle or bearing-block with a slightly-curved face $c$ between the bearing-faces $a\ b$ in order that the saddle A may fit properly toward the crank-hanger, while the faces $a\ b$ receive the saddle-post and front bar of the bicycle-frame when the machine is adjusted in the support or hanger. The middle face $c$ of the hanger is struck from a center of longer radius than either of the bearing-faces $a\ b$. These segmental bearing-faces are struck from different centers, and the radius of the individual segmental faces is shorter than the radius of the middle face $c$. The peculiar contour of the saddle enables it to fit between the divergent frame-bars well up to the crank-hanger of a bicycle and provides in a single device a suitable and proper bearing on which a bicycle when inverted may be held out of the way or in a position advantageous for its display.

This approximately crescent-shaped saddle A is formed in cross-section to present a channel or trough B, substantially as indicated by Fig. 3 of the drawings, and in said channeled or trough-like saddle the bars of the frame may rest without danger of displacement sidewise or laterally. To reduce to a minimum the liability to deface and mar the enamel and finish on the bicycle-frame, this channeled saddle is provided with grooved cushions or pads C D, which are made of rubber, felt, or other suitable material, fastened or confined in the channeled saddle by any suitable means.

My improved trough-like approximately crescent-shaped saddle is adapted to fit between the frame and lie in the same vertical plane of the bars thereof. Hence provision must be made for the attachment of the hanger-arm E to one side of the saddle. This may be accomplished in any suitable way preferred by a skilled mechanic; but as one method of attaching the hanger-arm to the saddle I have shown the saddle as provided with an extension or lug e, which is made or cast as an integral part of the saddle and which extends or projects outwardly from one side thereof, said extension being arranged at about the middle of the saddle. To this lug or extension e is fastened the hanger-arm E, by which the saddle is held rigidly in a position to receive the bicycle-frame.

The hanger-arm E may be attached to an overhead ceiling in a suitable way, and in this case the saddle A is arranged so its major axis is in a substantially horizontal plane, as represented by Figs. 1 and 2, in order that the bicycle-frame may rest upon the cushions on the bearing-faces a b of the saddle. Said hanger-arm may, however, be arranged horizontally and attached to a wall or other object, in which event the saddle should be arranged in a position where its major axis is nearly vertical, so that the bicycle-frame may bear upon the two faces a b or the cushions applied thereto. It is evident that these cushion blocks or pads may be omitted, if desired, and the bicycle-frame adapted to rest directly in the trough-like saddle; but I prefer to use some pad or lining on the bearing-faces to prevent injury to the enameled and finished surfaces of the bicycle when it is applied to or removed from the support.

In connection with the overhanging arm and saddle of my support I employ a retainer to engage with the front wheel of a bicycle when the latter is fitted in the support, said retainer serving to hold the front wheel and handle-bar from playing idly back and forth. The retainer consists of an arm F, provided at one end with a fork f to embrace or straddle the wheel, and said retainer-arm is attached pivotally to the overhanging arm B or to the extension e of the saddle A in order that the retainer may be thrown up and out of the way when the bicycle is to be placed in or removed from the saddle of the support.

I am aware that changes in the form and proportion of parts may be made by a skilled mechanic without departing from the spirit of my invention.

What I claim as new is—

1. In a bicycle-support, the combination of a crescent-shaped hanger-saddle of trough-shaped cross-sectional form and having the oppositely-facing bearing-surfaces, and a carrying-arm attached centrally to the hanger-saddle, substantially as described, for the purposes set forth.

2. In a bicycle-support, the crescent-shaped hanger-saddle of trough-shaped cross-sectional contour and provided with a centrally-arranged flat attaching-lug, combined with an overhanging arm which is fastened laterally to said attaching-lug and in central relation to the hanger-saddle, substantially as described, for the purposes set forth.

3. In a bicycle support or hanger, a bearing-block or saddle cast in a single piece of metal and curved continuously throughout its length to form at or near the terminals of said saddle or block the bearing-surfaces which face outwardly and in opposite directions, said saddle being trough-shaped in cross-section and adapted to clasp or embrace the frame-bars of a bicycle to restrain the latter from sidewise displacement, substantially as described, for the purposes set forth.

4. As a new article of manufacture, the bicycle-hanger comprising a single cast-metal saddle of trough-shaped cross-sectional contour and curved to present the oppositely-facing bearing-surfaces near the terminals thereof, and the cushion-blocks situated within said trough-shaped saddle and over the bearing-surfaces thereof, substantially as described, for the purposes set forth.

In testimony whereof I affix my signature in presence of two witnesses.

HOWARD T. SACKETT.

Witnesses:
J. T. WARNINGTON,
J. F. SMITH.